United States Patent [19]
Park et al.

[11] Patent Number: 6,072,908
[45] Date of Patent: Jun. 6, 2000

[54] GRID MOVING METHOD USING SELECTIVE PIXEL SEARCH METHOD AND APPARATUS USING THE GRID MOVING METHOD

[75] Inventors: Gwang-Hoon Park, Kangwon-do; Sung-Moon Chun, Kyonggi-do; Joo-Hee Moon, Seoul, all of Rep. of Korea

[73] Assignee: Hyundai Electronics Ind Co., Ltd., Kyoungki-do, Rep. of Korea

[21] Appl. No.: 08/936,038

[22] Filed: Sep. 23, 1997

[30] Foreign Application Priority Data

Sep. 25, 1996 [KR] Rep. of Korea .................. 96-42284

[51] Int. Cl.$^7$ ........................................ G06K 9/36
[52] U.S. Cl. .................................... 382/243; 348/420
[58] Field of Search .............................. 382/232, 236, 382/238–240, 242–243, 248–251, 170, 190; 348/402–407, 413, 416, 419, 420, 431; 358/426, 430, 432, 433

[56] References Cited

U.S. PATENT DOCUMENTS

| 5,612,743 | 3/1997 | Lee | 348/409 |
| 5,717,465 | 2/1998 | Kim | 348/420 |
| 5,799,109 | 8/1998 | Chung et al. | 382/243 |

FOREIGN PATENT DOCUMENTS

| 0639925 | 2/1995 | European Pat. Off. | H04N 7/32 |
| 0 809 405 | 11/1997 | European Pat. Off. | |

OTHER PUBLICATIONS

Ad Hoc Group on MPEG–4 Video VM Editing, "MPEG–4 Video Verification Model Version 7.0 Chapter 3: Encoder Definition," ISO/IEC JTC1/SC29/WG11, MPEG97/N1642, Apr. 1, 1997.

Sikora, et al., "Shape–Adaptive DCT for Generic Coding of Video," IEEE Transactions on Circuits an Systems for Video Technology, vol. 5, No. 1, Feb. 1, 1995, pp. 59–62.

European Search Report Cover Sheet including Annex.

*Primary Examiner*—Bhavesh Mehta
*Attorney, Agent, or Firm*—Lawrence G. Kurland, Esq.; Bryan Cave LLP

[57] ABSTRACT

An improved grid moving method using a selective pixel search method and an apparatus using the grid moving method which are capable of forming a grid with respect to an image of an object having a shape information and/or an image information, defining a unit region, moving the thusly formed grid, re-constructing an image grid, so that it is possible to reduce the number of blocks which are occupied by an object to be coded, thus significantly reducing the amount of computation and increasing a computation speed. The method includes the steps of forming a grid with respect to an image of an object having a predetermined shape, defining blocks each having a predetermined size, and moving the grid; a search and count step for selectively searching a pixel without searching all pixels, terminating the search when a pixel of the object is first searched, performing a step for determining the block in which an object exists as an object block with respect to the entire blocks, and counting the number of blocks in which the object exists; and determining a new grid start point having a minimum number of blocks in accordance with a result of the counting.

18 Claims, 13 Drawing Sheets

CONVENTIONAL ART

FIG. 3

CONVENTIONAL ART

AT THIS POINT AN OBJECT IS SEARCHED IN BLOCK

GRID MOVING METHOD USING SELECTIVE PIXEL SEARCH METHOD AND APPARATUS USING THE GRID MOVING METHOD

BACKGROUND OF THE INVENTION

1. Field of the Invention

The present invention relates to a grid moving method using a selective pixel search method and an apparatus using the grid moving method, and in particular, to an improved grid moving method using a selective pixel search method and an apparatus using the grid moving method which are capable of forming a grid with respect to an image of an object having a shape information and/or an image information, defining a unit region, moving the thusly formed grid, re-constructing an image grid, so that it is possible to reduce the number of blocks which are occupied by an object to be coded, thus significantly reducing the amount of computation and increasing a computation speed.

2. Description of the Conventional Art

Generally, in order to code a signal information of an object, a discrete cosine transform (hereinafter called DCT) and a vector quantizer are used. Recently, a shape adaptive DCT (hereinafter called SADCT) is used as a method for coding an object using a shape information of an object.

The above-described SADCT is directed to effectively coding a signal information of an object having a predetermined shape. Namely, an image frame is divided into blocks each having a predetermined size, thus coding only a signal information of the object.

Namely, when the block is filled with an information to be coded, the coding efficiency thereof becomes identical to a two-dimensional block DCT. When the block is not filled with an information to be coded, a one-dimensional DCT is processed with respect to the signals corresponding to the region of the object in the direction of a horizontal axis, and anther one-dimensional DCT is processed with respect to the results which are obtained after the previous one-dimensional DCT process in the direction of a vertical axis, thus thereby obtaining a final resultant value.

In addition, in the SADCT, a method of filling the block with as much as images of the objects can obtain more compression efficiency of a transform coefficient rather than dividing an image of an object into blocks based on the DCT coding gain.

Therefore, when performing the SADCT, the number of blocks within which the images of the objects to be coded is preferably reduced, thus coding the same.

In addition, when performing a conventional DCT or a block quantization, the coding is directly processed, thus increasing a bit ratio per frame and the number of blocks into which the images of the objects are occupied. Therefore, there is a predetermined limit for reducing the amount of signal information data.

Therefore, in order to overcome the above-described problems, the inventer of the present invention disclosed a method for adjusting a block position of the grid in accordance with the position of a target object and coding the same, thus thereby enhancing the coding efficiency.

It is possible to enhance the coding efficiency by reconstructing an image by moving the grid, estimating the motion of the object, and coding a texture information. In addition, the block grid is moved, and the start position is changed, so that the number of blocks corresponding to the objects is minimized. The above-described method is called as a shape adaptive region splitting method.

The above-described shape adaptive region splitting is used for a videophone, a teleconference, a personal communication system (PCS), a mobile phone, an advanced coding technique, etc. which are applicable using an MPEG-IV.

If there is provided an object, which is to be coded, in an image screen, a predetermined object or a certain region having a shape information is coded by the block unit on one screen.

Here, the unit of blocks is N×M, and a polygonal shape such as trigonal, hexagonal, etc. may be defined in one block.

Generally, if there is provided an object, which is to be coded, in an image screen, a shape adaptive region splitting is used with respect to a predetermined object or a certain region having a shape information.

For example, in the MPEG-IV, a VOP may be deemed as an object of the image screen.

The VOP is directed to separately coding an object by separating objects when there is provided an object in an image screen.

At this time, the horizontal and vertical values of a minimum image size of an object and an object information are transferred.

When performing the shape adaptive region splitting method, in the block-based coding process, in a state that the object is not moved, the grid is moved, and a grid start point is searched and coded so that the block having a minimum number of shapes of an object is formed, thus enhancing a coding efficiency.

Figure 1:
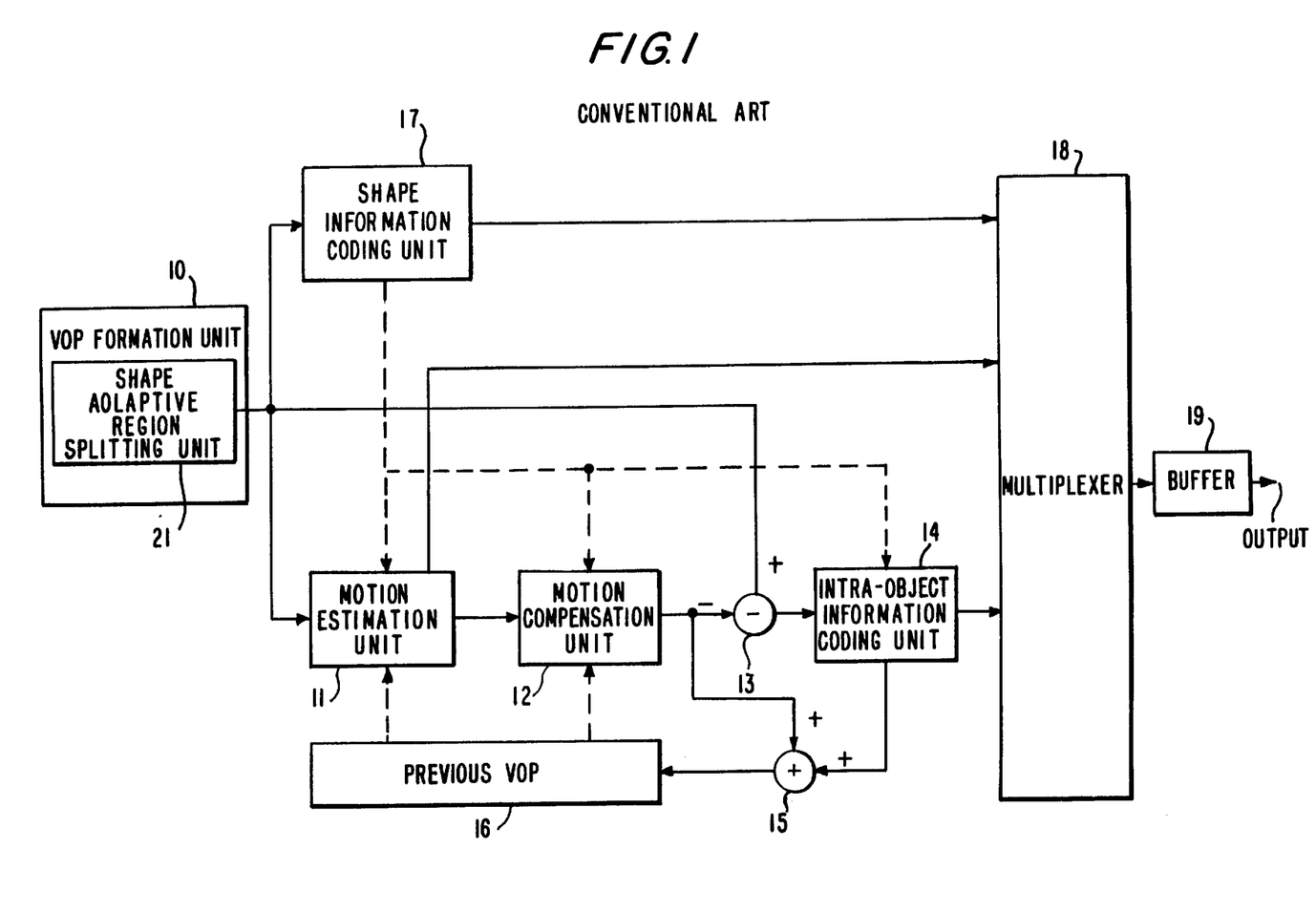
FIG. 1 is a block view illustrating a conventional VOP coding unit of a VM encoder.

FIG. 1 illustrates a VOP coding unit of a conventional VM (Verification Model) encoder. The VOP with respect to each object image formed by a VOP formation unit 10 is inputted into a motion estimation unit, thus estimating a motion by the unit of macro blocks.

The motion information estimated by the motion estimation unit 11 is inputted into a motion compensation unit 12, thus compensating the motion of the object.

In addition, the VOP the motion of which is compensated by the motion compensation unit 12 and the VOP formed by the VOP formation unit 10 are inputted into a subtractor 13, and a difference value therebetween is computed by the subtractor 13. The difference value computed by the subtractor 13 is inputted into an intra-object information coding unit 14, and the intra-object information is coded by the sub-block unit of the macro block.

The VOP the motion of which is compensated by the motion compensation unit 12 and the intra-object information coded by the intra-object coding unit 14 are inputted into an adder 15, the thusly inputted values are added by the adder 15. The output signal from the adder 15 is inputted into a previously reconstructed VOP 16, thus detecting a VOP of the previous screen.

The VOP of the previous screen detected by the VOP detection unit 16 is inputted into the motion estimation unit 11 and the motion compensation unit 12, respectively, and is used for a motion estimation and motion compensation.

Meanwhile, the VOP formed by the VOP formation unit 10 is inputted into the shape information coding unit 17, thus coding a shape information.

Here, the use of the output signal from the shape information coding unit 17 is determined based on an applicable field of the VOP coding unit. The output signal from the shape information coding unit 17 is inputted into the motion estimation unit 11, the motion compensation unit 12, and the intra-object information coding unit 14, respectively.

The motion information estimated by the motion estimating unit 11, the intra-object information coded by the intra-object information coding unit 14, and the shape information coded by the shape information coding unit 17 are multiplexed by a multiplexer 18 and then is transferred in a bit stream form through a buffer 19.

Figure 2:
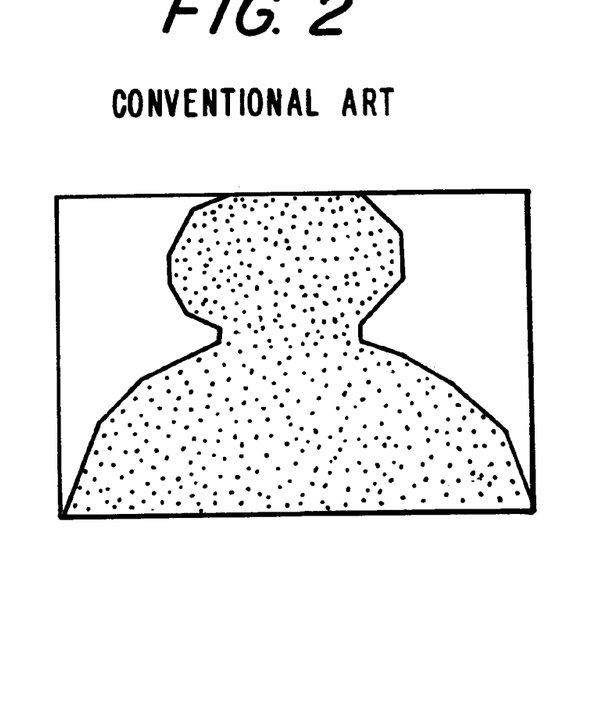
FIG. 2 is a view illustrating an object to be coded.

FIG. 2 illustrates a minimum size of square containing an object to be coded in a method of FIG. 1.

Figure 3:
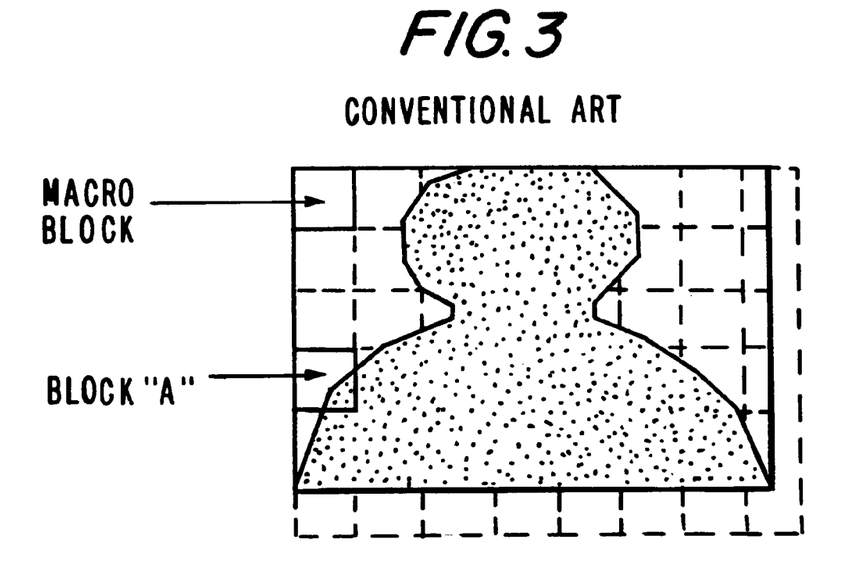
FIG. 3 is a view illustrating an object of FIG. 2 which is shown by the macro block unit.

FIG. 3 is a view illustrating an object enlarged in the rightward direction and lowerward direction by the unit of a macro block size. The number of blocks within which the object is defined through a start point conversion by moving the block grid (dotted line).

Figure 4:
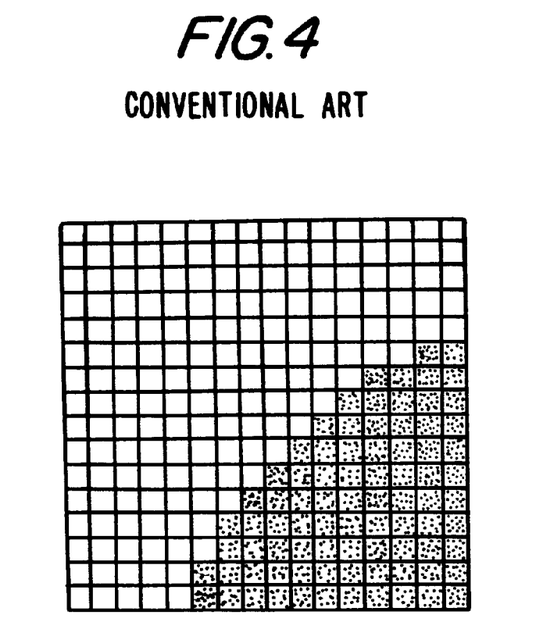
FIG. 4 is an enlarged view illustrating a block "A" of FIG. 3.

FIG. 4 is an enlarged view illustrating a block A which is one of object boundary blocks of FIG. 3. The size of the block is 16×16. Here, the size of the same may be preferably 4×4. The size thereof is defined as N×M.

Figure 5:
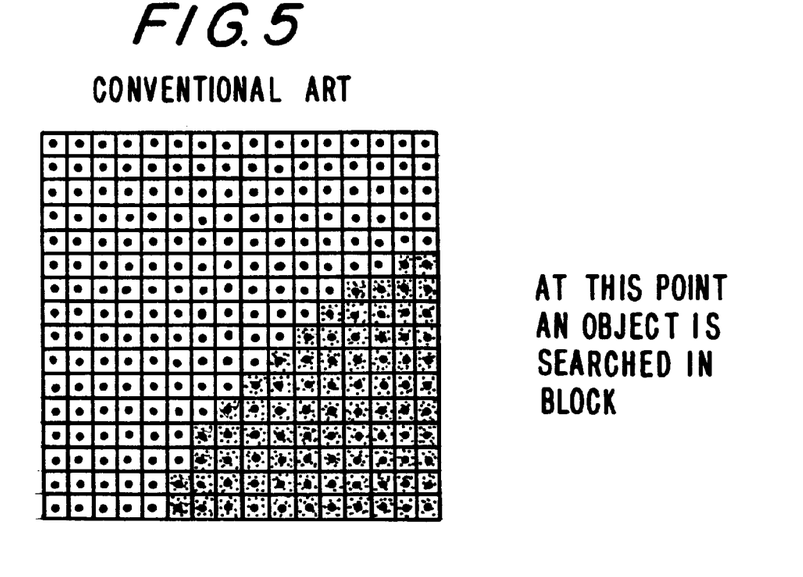
FIG. 5 is a view illustrating a method of searching entire pixels in order to judge whether an object exists within the block of FIG. 4.

In the conventional art, a previous pixel of a block is searched in order to determined whether an object is defined within the block of FIG. 5.

For example, when the size of the block is 16×16, the maximum number of pixels is 256 in order to determined whether an object exists in the block.

Therefore, while the 256 pixels are being searched, even if one pixel is searched, the block in which the pixel exists is judged to be a block in which the pixel exists, and then the searching is performed with respect to the next block.

In addition, the entire blocks should be checked in order to determine whether an object exists in the block.

Therefore, in the conventional art, since it is verified whether an object exists in each block of the entire VOP while the block grid start point is being moved, the computation is repeatedly performed, and the computation speed becomes slow.

Namely, in the conventional art, since the entire pixels of the block should be checked in order to determine whether an object exists within a predetermined block, the computation speed becomes slow.

SUMMARY OF THE INVENTION

Accordingly, it is an object of the present invention to provide an improved grid moving method using a selective pixel search method and an apparatus using the grid moving method which overcome the aforementioned problems encountered in the conventional art.

It is another object of the present invention to provide an improved grid moving method using a selective pixel search method and an apparatus using the grid moving method which are capable of forming a grid with respect to an image of an object having a shape information and/or an image information, defining a unit region, moving the thusly formed grid, re-constructing an image grid, so that it is possible to reduce the number of blocks which are occupied by an object to be coded, thus significantly reducing the amount of computation and increasing a computation speed.

To achieve the above objects, there is provided an improved grid moving method using a selective pixel search method which includes the steps of forming a grid with respect to an image of an object having a predetermined shape, defining blocks each having a predetermined size, and moving the grid; a search and count step for selectively searching a pixel without searching all pixels, terminating the search when a pixel of the object is first searched, performing a step for determining the block in which an object exists as an object block with respect to the entire blocks, and counting the number of blocks in which the object exists; and determining a new grid start point having a minimum number of blocks in accordance with a result of the counting.

To achieve the above objects, there is provided an improved apparatus using a grid moving method using a selective pixel search method which includes an address generation control unit for moving a start position at which an address is generated by a predetermined distance within a predetermined area of a unit region; an address generation unit for generation an address so that an image of the object is defined by the unit region in accordance with an address start position from the address generation control unit; a memory unit for storing an image of an object having a predetermined shape information and outputting the thusly stored image in accordance with an address from the address generation unit; an edge pixel searching unit for constructing the image data from the memory unit from one-dimensional form to two-dimensional form, defining the image data into an N×M block unit, and determining whether an object exists in only the pixels formed in the edge portion of the block; a block number counting unit for counting the number of blocks in which the object exists as a result by the edge pixel searching unit; and a minimum block grid selection unit for determining a start point so that the minimum block is constructed based on the data counted by the block number counting unit.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The grid moving method using a selective pixel searching method and an apparatus using the same according to the present invention will now be explained with reference to the accompanying drawings.

Figure 6:
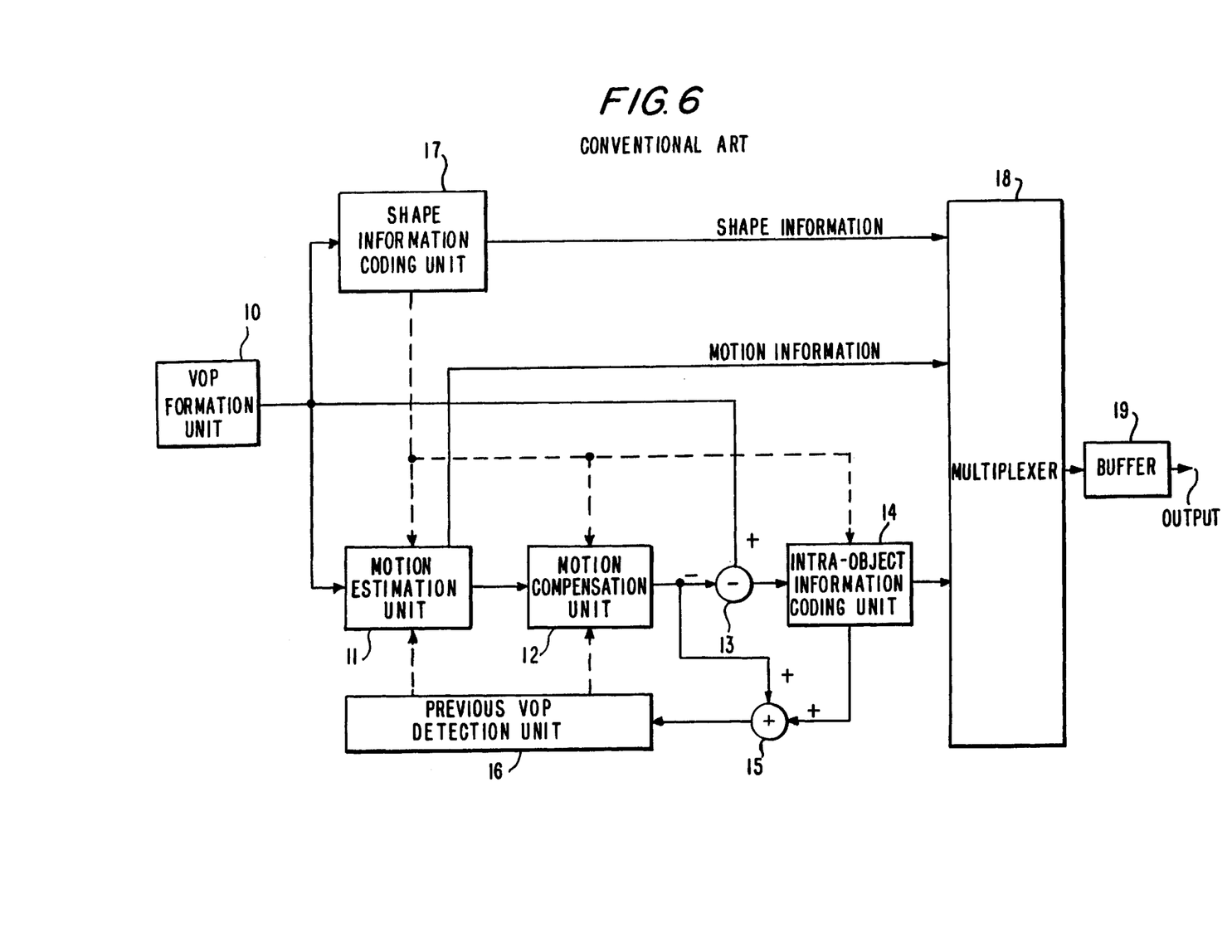
FIG. 6 is a block diagram illustrating a shape adaptive region splitting unit according to the present invention which is configured in a VOP coding unit which was first determined by International Standardization Committee.

FIG. 6 illustrates a shape adaptive region splitting unit 21 of a VOP coding unit of a VM encoder according to the present invention, which is first recommended by an international standardization committee.

As shown therein, there is provided a shape adaptive region splitting unit 21 in the VOP formation unit 10, and an information amount decreasing position is determined in accordance with a position at which a contour of an image of an object of a VOP is formed by moving a horizontal axis and vertical axis grid start point of a macro block.

The positions at which the number of macro blocks in which a contour of an object image exists becomes minimum are defined as an optimum horizontal axis and vertical axis, and the thusly determined optimum horizontal axis and vertical axis are inputted into the shape information coding unit 17.

Therefore, the macro blocks are reconstructed by the shape information coding unit 17 in accordance with the optimum horizontal axis and vertical axis grid start point from the shape adaptive region splitting unit 21, and the shape information of the object is coded, and the thusly coded information is transferred to the multiplexer 18.

Figure 7:
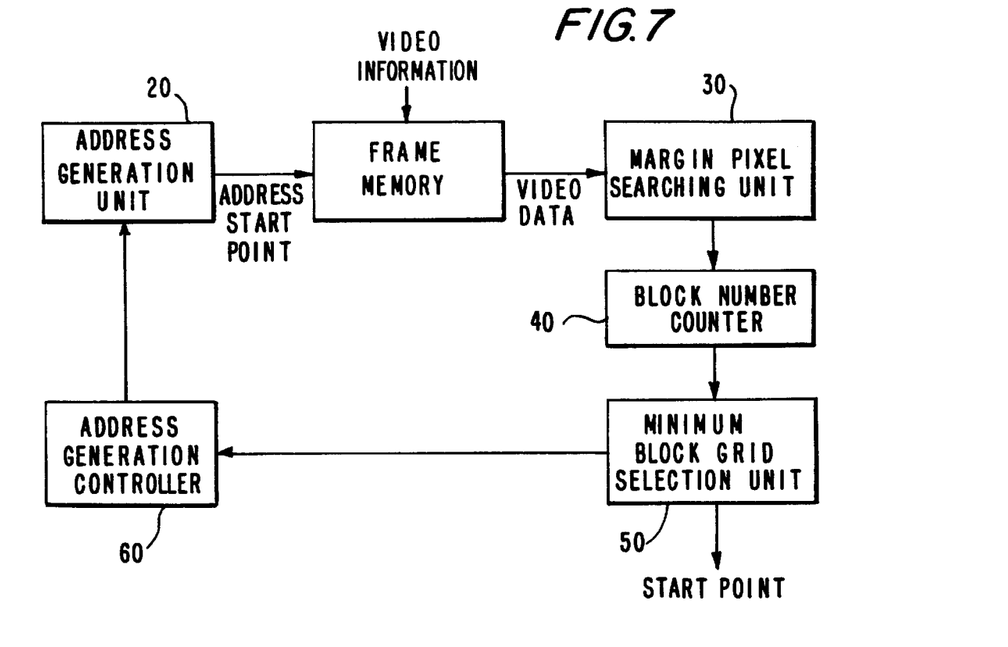
FIG. 7 is a block diagram illustrating a shape adaptive region splitting unit of FIG. 6 according to the present invention.

FIG. 7 is a block diagram illustrating a shape adaptive region splitting unit 21 of FIG. 6, which includes a frame memory 5 for transferring a stored image to the next block in accordance with an address, an address generation unit 20 generating leftwardmost and uppermost address start points which correspond to the first block when splitting an object into block units and outputting the thusly generated points to the frame memory 5, an edge pixel searching unit 30 for constructing an image data from the frame memory 5 from one dimensional shape to two dimensional shape, separating the data into N×M block units, and verifying whether an object exists in only the edge pixel of the block, a block number counter 40 for counting the number of blocks in which a block exists by using the edge pixel searching unit 30, a minimum block grid selection unit 50 for determining a start point for constructing a minimum block based on the data counted by the block number counter 40, and an address generation controller 60 for moving the leftwardmost and upper most start portions by N×M and transmitting a start point information to the address generation unit 20.

The size of the frame memory 5 should be larger that the size of an image, for example, the block size of N×M is defined to cover the boundary.

In addition, in the address generation unit 20, the horizontal axis size determination unit determines the size of the horizontal axis of the macro block in accordance with a size information of the image of the object, and the vertical axis size determination unit determines the size of the vertical axis of the macro block.

The block number counter 40 includes a block count unit for counting a clock signal and separating a unit region, a shape information presence judging unit for separating a unit region of an image from the frame memory 5 in accordance with an output signal from the block count unit and judging whether a shape information of an object exists, and a region number adding unit for counting a judging signal from the shape information presence judging unit and outputting the number of unit regions in which an image of the object exists.

Here, if the size of the horizontal axis and the size of the vertical axis of the macro block are identical, the size of the macro block is determined by using only one size determination unit.

Figure 8:
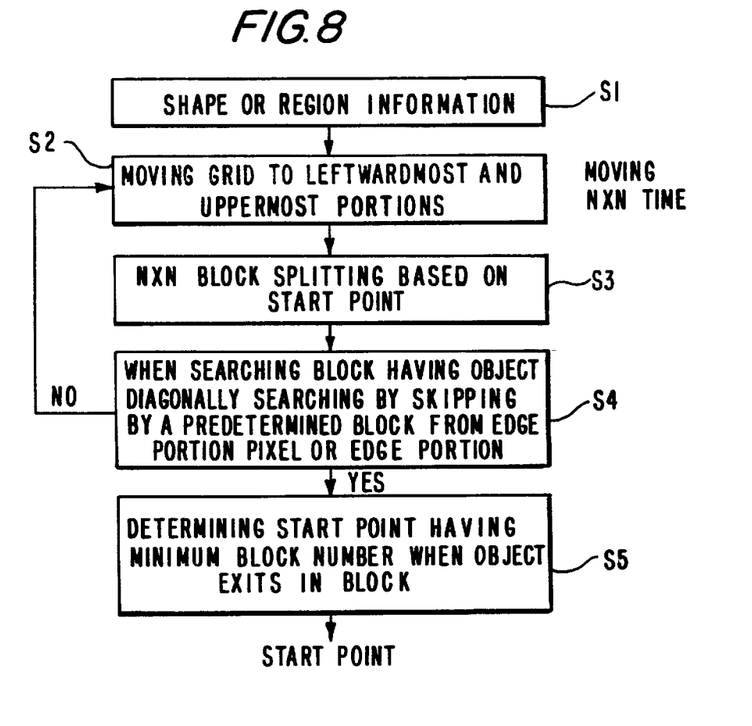
FIG. 8 is a flow chart illustrating an operation of a shape adaptive region splitting acceleration apparatus according to the present invention.

With the above-described construction, in the present invention, in Step S2, the grid position is moved N×M time based on a shape or region information (Step S1) as shown in FIG. 8, and an N×M block splitting (Step S3) is performed based on a start point. When searching the block containing an object therein, only the edge pixel of the block is verified, or the pixels are checked by skipping by a predetermined blank, or the pixels are diagonally checked in Step S4, and then the start point having a minimum block number at which the object exists within the block is determined in Step S5.

FIG. 8 illustrates the grid moving method in Steps S1 through S5 of FIG. 8. The detailed description of the above-described grid moving method is disclosed in PCT application (PCT/KR 96/00106 and U.S. patent application Ser. Nos.: 08/679/758, 08/679,3765, 08/679,760, and 08/679,366.

Figure 9:
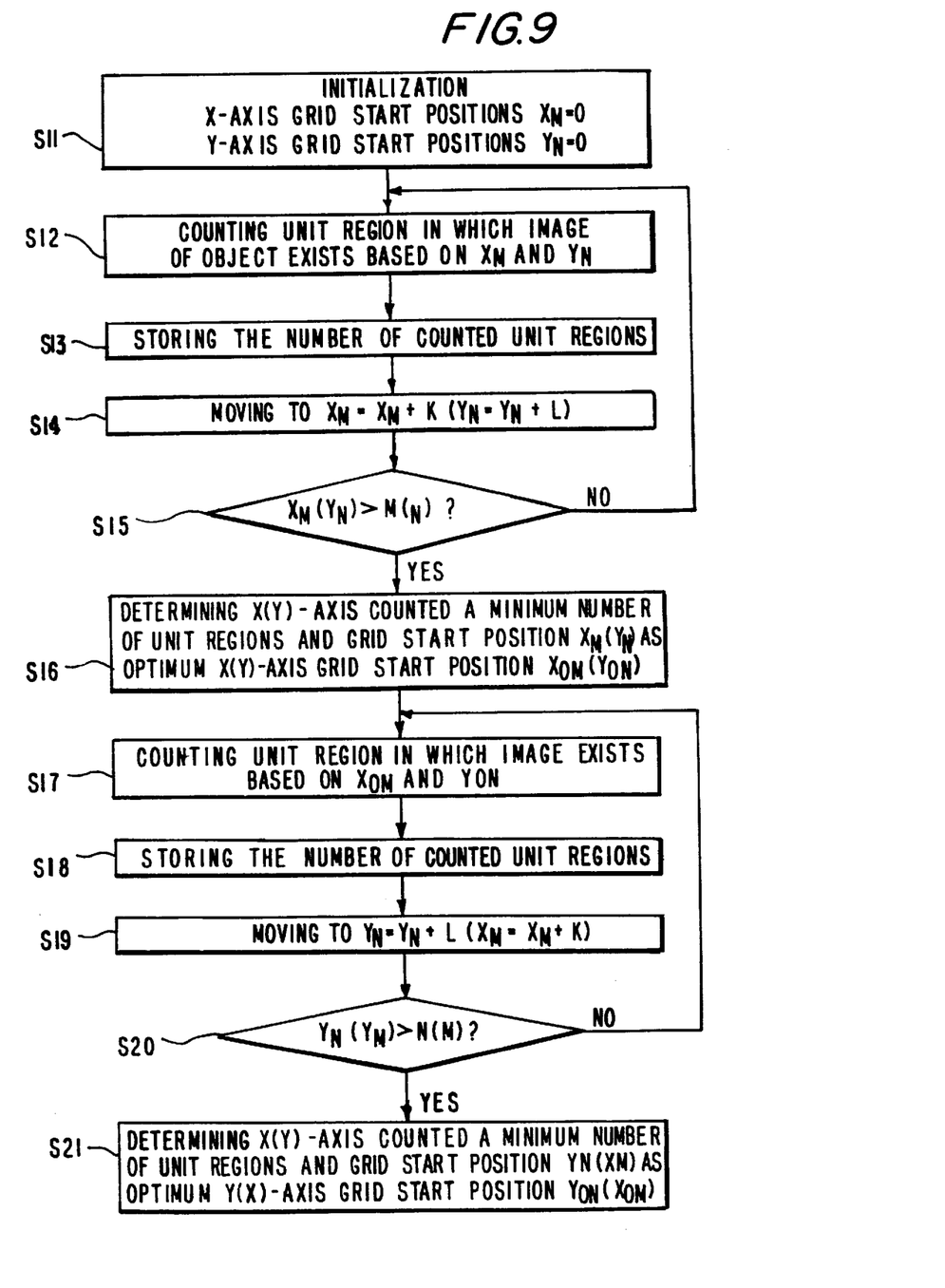
FIGS. 9 through 13 are flow charts illustrating a grid moving method according to the present invention.

The above-described grid moving method is shown in FIGS. 9 through 13. FIG. 9 is a flow chart of a signal for searching an information amount decreasing position in accordance with the grid moving method. In FIG. 9, Steps S16 through S19 relate to a grid moving method.

Figure 10:
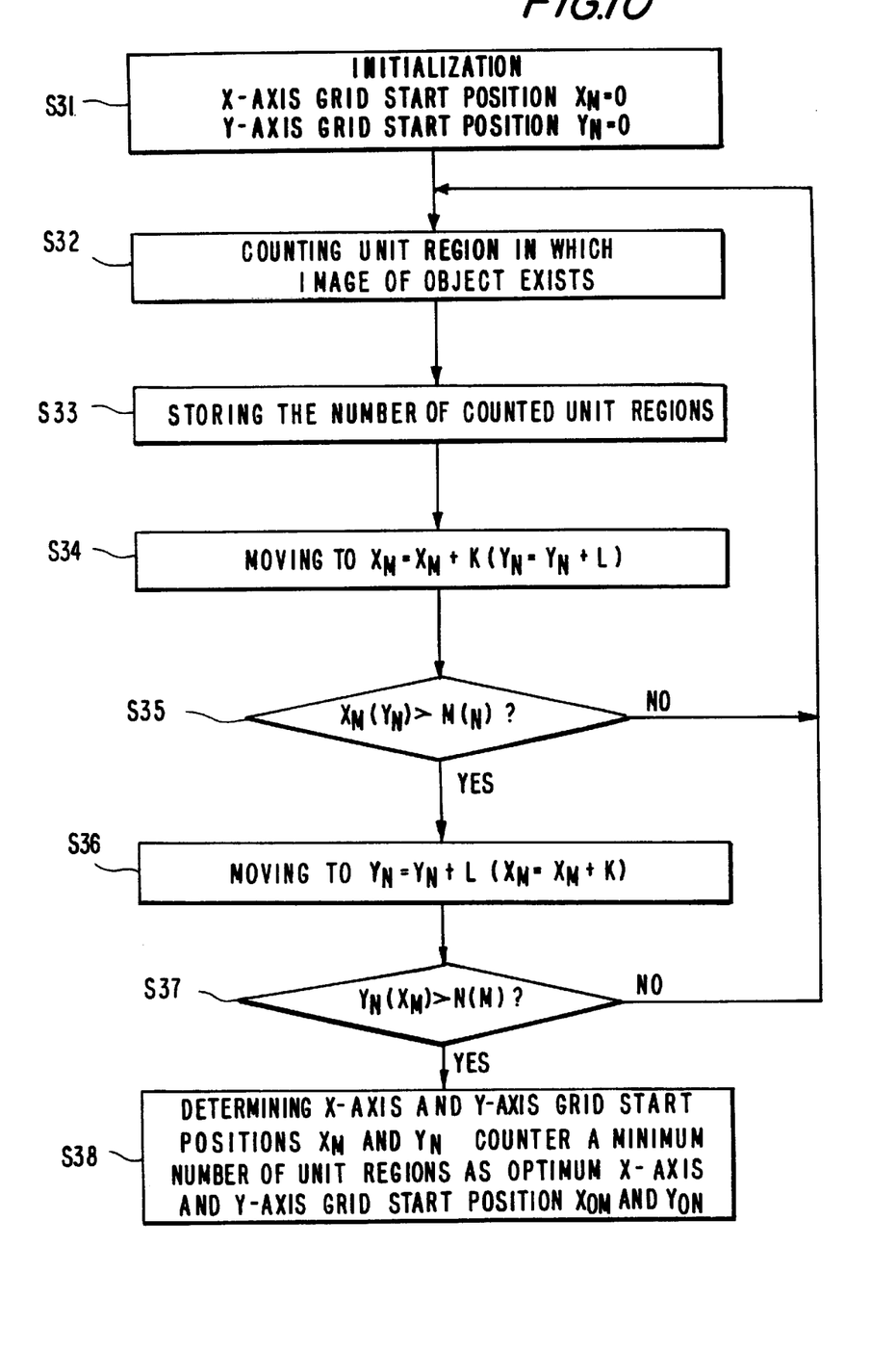

FIG. 10 is a flow chart of a signal for searching an information amount decreasing position in accordance with a grid moving method according to another embodiment of the present invention. In FIG. 10, Steps S34 through S36 relate to a grid moving method.

Figure 11:
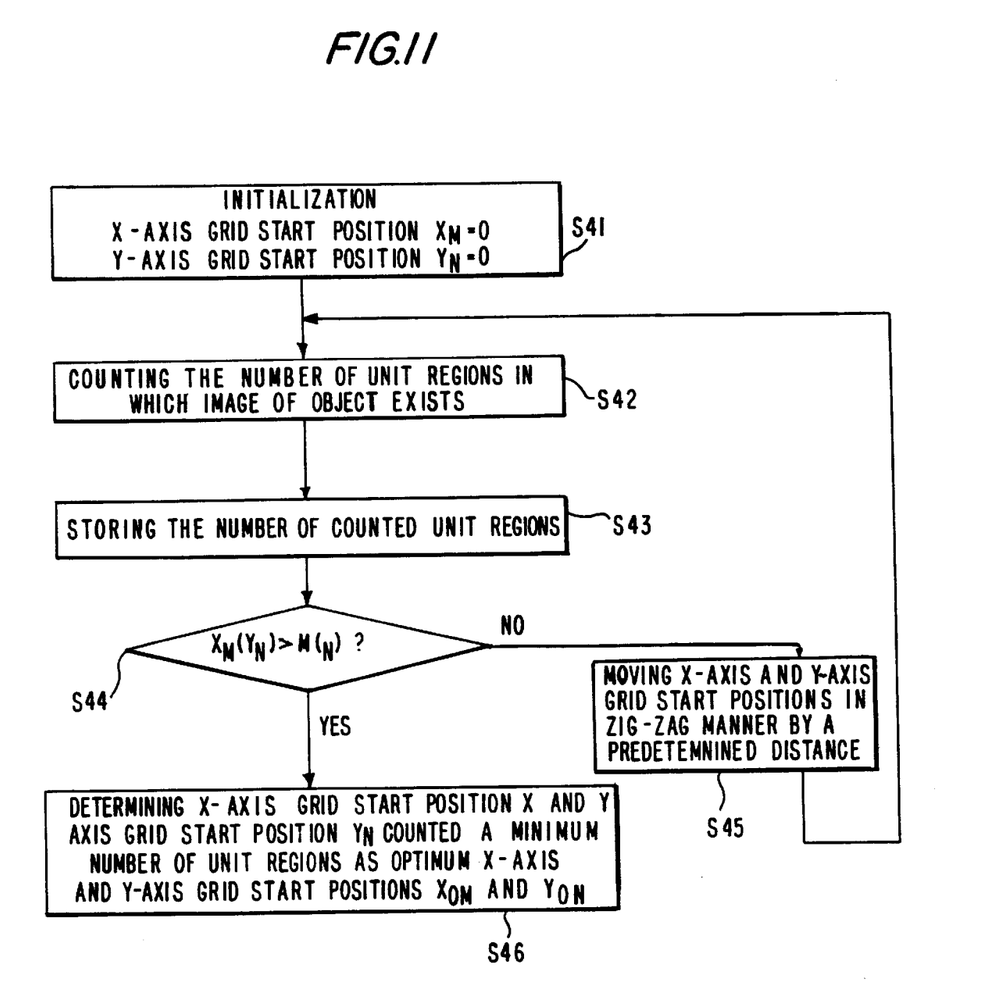

FIG. 11 is a flow chart of a signal for searching an information amount decreasing position in accordance with a grid moving method according to still another embodiment of the present invention. In FIG. 11, Steps S44 and S45 relate to a grid moving method.

Figure 12:
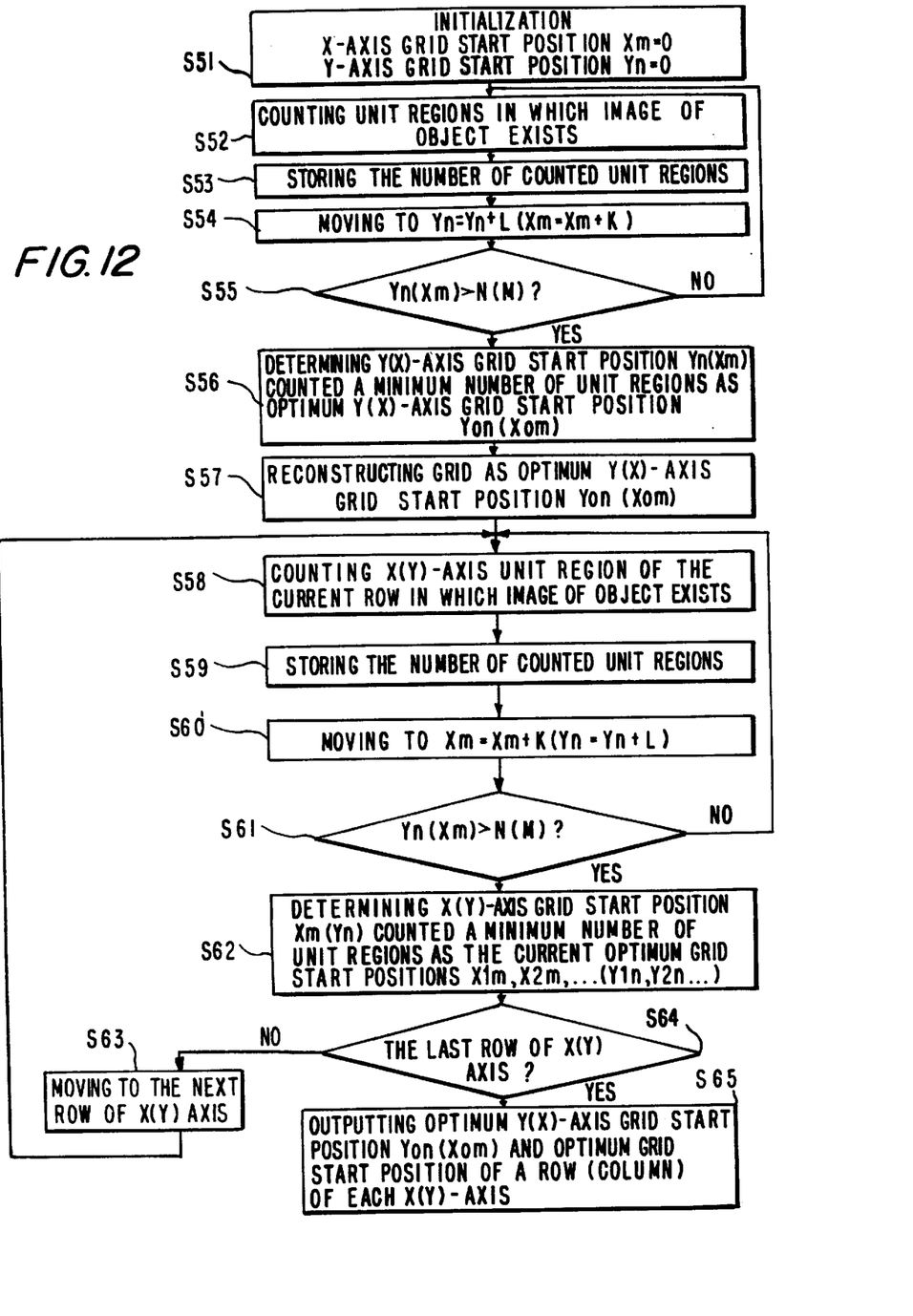

FIG. 12 is a flow chart of a signal for searching an information amount decreasing position in accordance with a grid moving method according to still another embodiment of the present invention. In FIG. 12, S54 and S55 and Steps S60 and S61 relate to a grid moving method.

Figure 13:
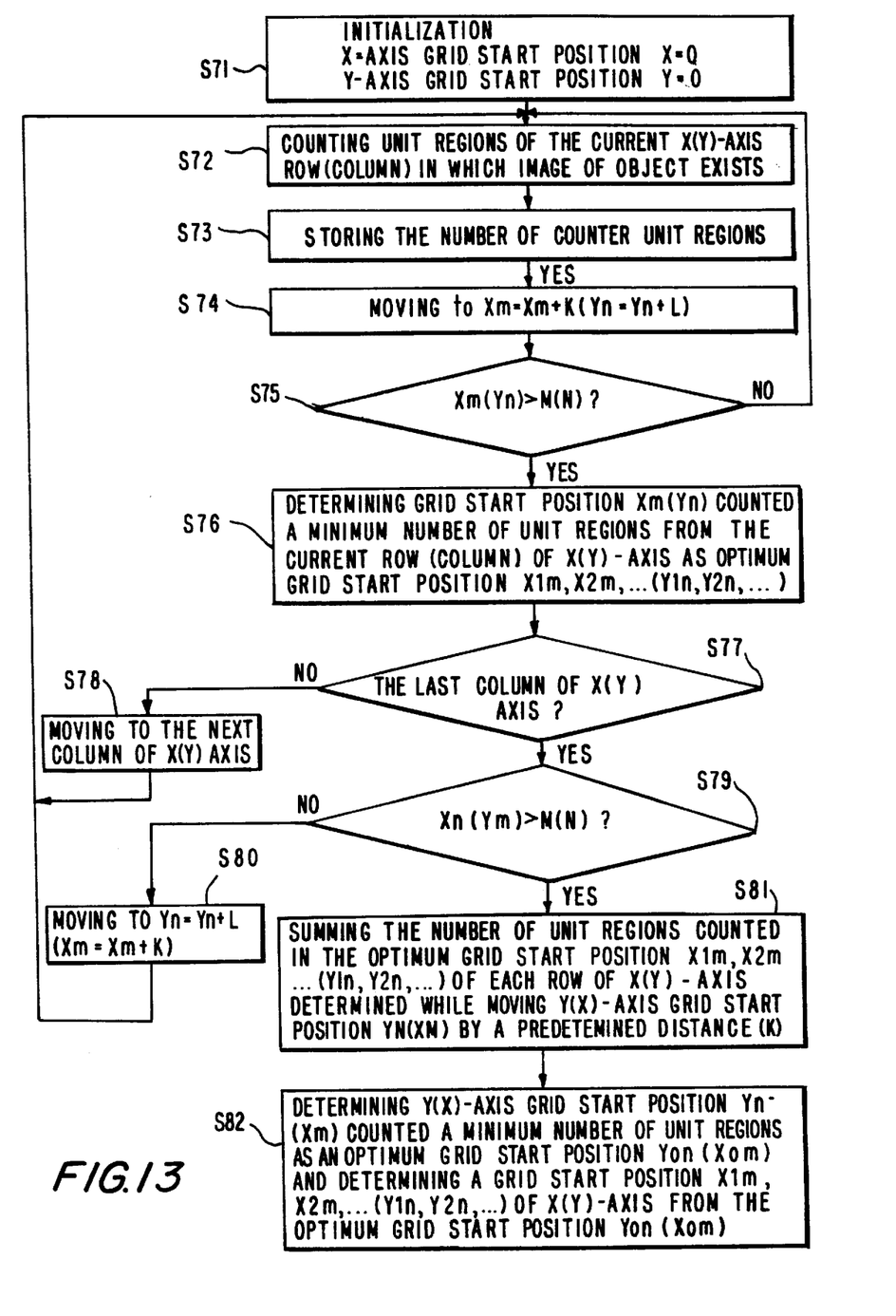

FIG. 13 is a flow chart of a signal for searching an information amount decreasing position in accordance with a grid moving method according to still another embodiment of the present invention. In FIG. 13, Steps S74, S78 and S80 relate to a grid moving method.

In the present invention, an edge searching method for searching a start point while moving the grid and determining whether an object exists in each block when forming a shape adaptive region during a VOP formation process relates to Step S4 of FIG. 8. In steps of FIG. 14, the position at which it is determined whether an object exists in the block is verified at only the edge portion of the block.

Figure 14:
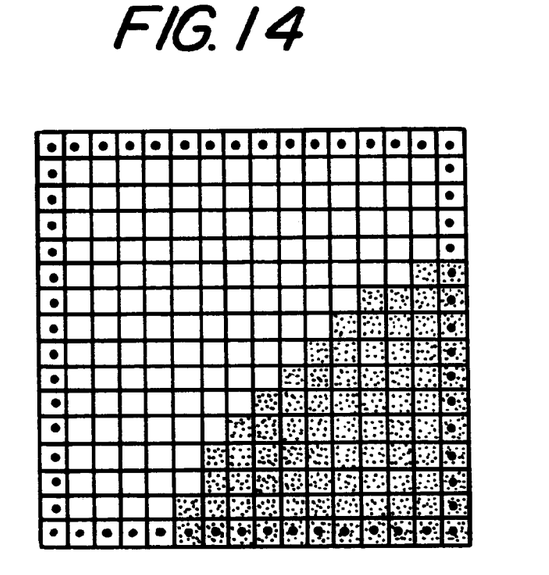
FIG. 14 is a view illustrating a method for searching an edge portion of a block when identifying an object within a block according to the present invention.

Here, when the size of the block as shown in FIG. 14 is 16×16, the number of the positions at which it is determined whether an object exists in the block is 60.

In order for an object to exist in the block, since a predetermined portion of the boundary should contact, it is possible to identically obtain a coding gain from a shape adaptive region splitting method, so that the computation time is actually reduced by about ¼.

Exceptionally, if an object exists at the center of the object, there is not a contact in the block even when the object exists in the block. In this case, the coding obtains no gain. Therefore, the process thereof is neglected.

Figure 15:
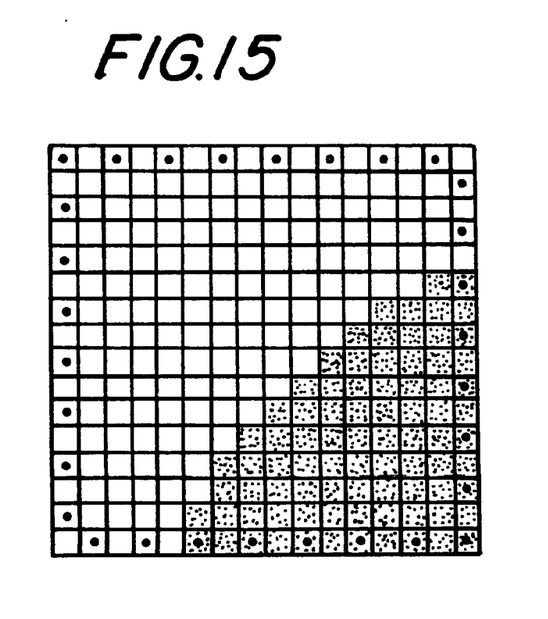
FIG. 15 is a view illustrating a method for searching an object within a block by skipping the blocks by one block from an edge portion according to the present invention.

FIG. 15 illustrates a method for searching whether an object exists in the block by skipping at the edge portion of the block without searching the edge portion of the block in order to search whether an object exists in the block as shown in FIG. 14. For example, if the size of the block is 16×16, the number of positions at which it is determined whether an object exists in the block is 30.

In this case, the computation speed is increased twice rather than when the object is searched in the block as shown in FIG. 5, thus decreasing the computation time by ⅛.

Figure 16:
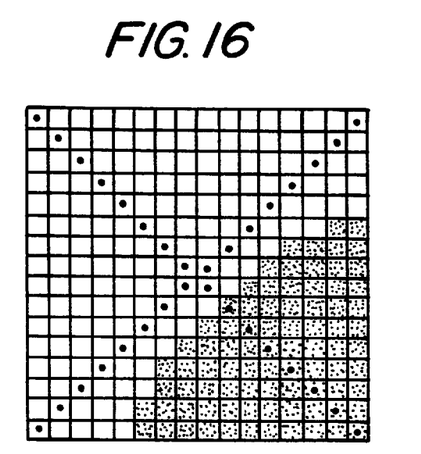
FIG. 16 is a view illustrating a method for diagonally searching an object within a block according to the present invention.

FIG. 16 is a view illustrating a method for diagonally searching whether an object exists in the block. In this case, the objects are searched by diagonally skipping by N-blocks (for example, by skipping one block or two blocks).

Figure 17:
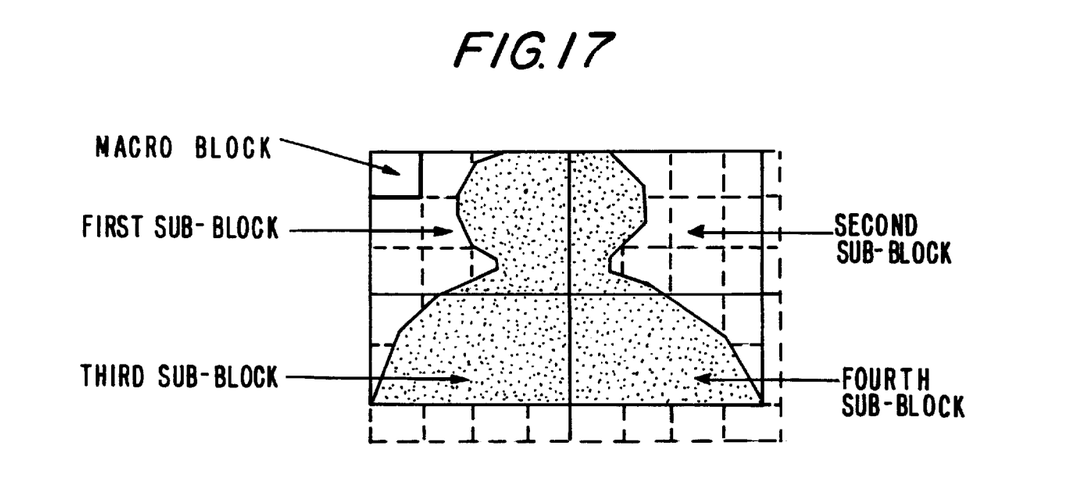
FIG. 17 is a view illustrating first, second, third and fourth portions by splitting an object image into four portions, which is to be coded according to the present invention.

FIG. 17 is a view illustrating a method for searching whether an object exists in each of the first, second, third and fourth blocks with respect to a predetermined image to be coded. In FIG. 17, the upper and leftward block is defined as the first block, the upper and rightward block is defined as the second block, the lower and leftward block is defined as the third block, and the lower and rightward block is defined as the fourth block.

Figure 18:
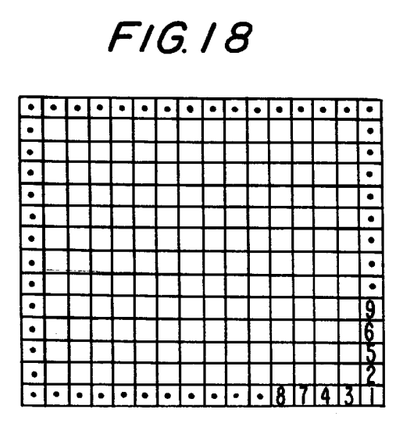
FIG. 18 is a view illustrating a method that a block is searched sequentially from the block in which an object exists at maximum probability when the block relates to a first portion of FIG. 17 according to the present invention.

FIG. 18 illustrates the sequence of positions for searching whether an object exists in the first block as shown in FIG. 17. Namely, the object is searched in only the edge portion to determine whether an object exists in the block from the center portion to the corner portion which is defined nearest the center portion.

Namely, the object is searched in zig-zag manner in the sequence of the numbers labelled in the drawing from the lower and rightward portion which is defined nearest the center portion.

Figure 19:
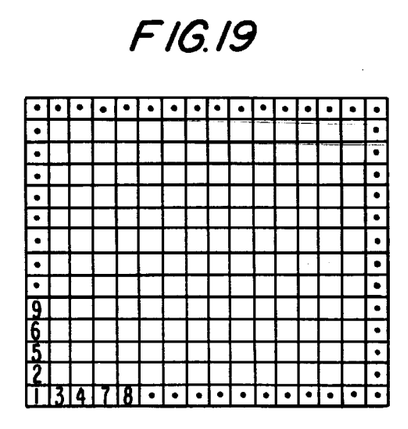
FIG. 19 is a view illustrating a method that a block is searched sequentially from the block in which an object exists at maximum probability when the block relates to a second portion of FIG. 17 according to the present invention.
Figure 20:
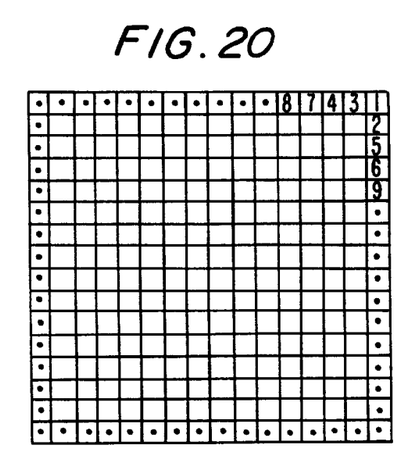
FIG. 20 is a view illustrating a method that a block is searched sequentially from the block in which an object exists at maximum probability when the block relates to a third portion of FIG. 17 according to the present invention.
Figure 21:
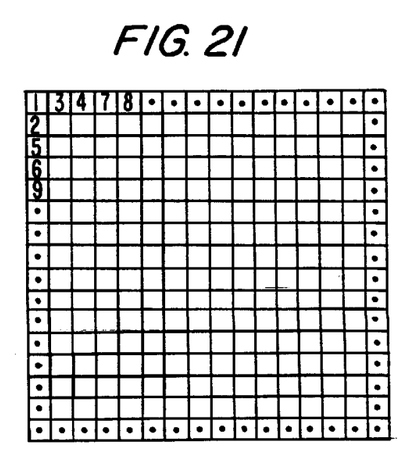
FIG. 21 is a view illustrating a method that a block is searched sequentially from the block in which an object exists at maximum probability when the block relates to a fourth portion of FIG. 17 according to the present invention.

FIGS. 19 through 21 are views illustrating a start position and sequence for searching whether an object exists in the second through fourth blocks. In FIG. 18, the object is searched in zig-zag manner from the corner portion which is defined nearest the center portion.

Namely, the above-described object searching operation is first performed from the block which has the highest probability, so that the computation speed of the shape adaptive region splitting is increased.

When splitting the object to be coded into four blocks, since the probability with respect to a condition that the object exists in the center portion is highest, it is possible to increase the computation speed.

In the present invention, in the case that the size of the block (N×M) is large, it is possible to search an object by diagonally splitting the block. In addition, it is possible to search an object by splitting the block into four sub-blocks.

In addition, when searching whether an object exists in the block from the edge portion of the block, the block is skipped by one block in the embodiment of FIG. 15. More preferably, it is possible to search the objects by skipping by two or more blocks when it is necessary to increase the computation speed.

Furthermore, in the present invention, the above-described techniques are not limited to the embodiment of the square-shaped blocks. The techniques may be adapted to a polygonal shape block such as a triangle shape block, hexagonal shape block, etc.

As described above, in the present invention, it is possible to search an object whether it exists in the block by skipping by N-blocks from the edge portion of the block without searching all pixels of the block when splitting the shape adaptive region, thus increasing the computation speed.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A grid moving method using a selective pixel searching method, comprising the steps of:

forming a grid with respect to an image of an object having a predetermined shape, defining blocks each having a predetermined shape, defining blocks each having a predetermined size, and moving the grid;

a search and count step for selectively searching a pixel without searching all pixels, terminating the search when a pixel of the object is first searched, performing a step for determining the block in which an object exists as an object block with respect to the entire blocks, and counting the number of blocks in which the object exists; and determining a new grid start point having a minimum number of blocks in accordance with a result of the counting; and, wherein in said step for selectively searching whether an object exists in the block, the searching is performed with respect to all pixels formed in an edge boundary portion of the block.

2. A grid moving method using a selective pixel searching method, comprising the steps of:

forming a grid with respect to an image of an object having a predetermined shape, defining blocks each having a predetermined shape, defining blocks each having a predetermined size, and moving the grid;

a search and count step for selectively searching a pixel without searching all pixels, terminating the search when a pixel of the object is first searched, performing a step for determining the block in which an object exists as an object block with respect to the entire blocks, and counting the number of blocks in which the object exists; and determining a new grid start point having a minimum number of blocks in accordance with a result of the counting; and, wherein in said step for selectively searching whether an object exists in the block, the searching is performed with respect to an edge boundary portion of the block in a manner of skipping the blocks by N-blocks.

3. A grid moving method using a selective pixel searching method, comprising the steps of:

forming a grid with respect to an image of an object having a predetermined shape, defining blocks each having a predetermined shape, defining blocks each having a predetermined size, and moving the grid;

a search and count step for selectively searching a pixel whether an object exists in the block with respect to all pixels formed in an edge boundary portion of the block, terminating the search when a pixel of the object is first searched, performing a step for determining the block in which an object exists as an object block with respect to the entire blocks, and counting the number of blocks in which the object exists;

determining a new grid start point having a minimum number of blocks in accordance with a result of the counting; and splitting an object image to be coded into four sub-blocks after the grid moving step in such a manner that an upper and leftward portion is defined as a first sub-block, an upper and rightward portion is defined as a second sub-block, a lower and leftward portion is defined as a third sub-block, and a lower and rightward block is defined as a fourth sub-block, thus selectively searching the objects, whereby the blocks are selectively searched in accordance with a result that a predetermined block is judged to correspond to a predetermined sub-block among the first, second, third and fourth blocks.

4. The method of claim 3, wherein said searching is performed in a zig-zag manner with respect to the edge boundary portion from the rightward and lower corner pixels in the first sub-block in order to determine whether an object exists in a predetermined block.

5. The method of claim 3, wherein said searching is performed in a zig-zag manner with respect to the edge boundary portion from the leftward and lower corner pixels in the second sub-block in order to determine whether an object exists in a predetermined block.

6. The method of claim 5, wherein said searching is performed in a zig-zag manner with respect to the edge boundary portion from the rightward and upper corner pixels in the third sub-block in order to determine whether an object exists in a predetermined block.

7. The method of claim 3, wherein said searching is performed in a zig-zag manner with respect to the edge boundary portion from the leftward and upper corner pixels in the fourth sub-block in order to determine whether an object exists in a predetermined block.

8. A grid moving apparatus using a selective pixel searching method, comprising:

an address generation control means for moving a start position at which an address is generated by a predetermined distance within a predetermined area of a unit region;

an address generation means for generation an address so that an image of the object is defined by the unit region in accordance with an address start position from the address generation control means;

a memory means for storing an image of an object having a predetermined shape information and outputting the thusly stored image in accordance with an address from the address generation means;

an edge pixel searching means for constructing the image data from the memory means from one-dimensional form to two-dimensional form, defining the image data into an N×M block unit, and determining whether an object exists in only the pixels formed in the edge portion of the block;

a block number counting means for counting the number of blocks in which the object exists as a result by the edge pixel searching means; and a minimum block grid selection means for determining a start point so that the minimum block is constructed based on the data counted by the block number counting means.

9. The apparatus of claim 8, wherein said address generation means includes:

a horizontal axis size determining means and a vertical axis size determining means for determining a horizontal size and of a unit region and a vertical size of a unit region in accordance with a size information of an object image; and a region address generation means for defining the horizontal axis size and vertical axis size of the unit region determined by the horizontal axis determination means and vertical axis size determination means from the address start position from the address generation control means and sequentially generating the addresses in accordance with the horizontal axis and vertical axis sizes of the defined unit region.

10. The apparatus of claim 8, wherein said horizontal axis size and vertical axis size of the unit region are determined by one size termination means when the horizontal axis size and vertical axis size of the unit region are identical.

11. The apparatus of claim 8, wherein said block number counting means includes:

a block count means for counting a clock signal and defining a unit region;

a shape information presence judging means for defining a unit region of an image from the memory means in accordance with an output signal from the block counting means and judging whether a shape information of the object exists; and a region number adding means for counting judging signals from the shape information presence judging means and outputting the number of unit regions in which an image of the object exists.

12. A grid moving method using a selective pixel searching method, comprising the steps of:

forming a grid with respect to an image of an object having a predetermined shape, defining blocks each having a predetermined size, and moving the grid;

a search and count step for selectively searching a pixel whether an object exists in the block with respect to all pixels formed in an edge boundary portion of the block, terminating the search when a pixel of the object is first searched, performing a step for determining the block in which an object exists as an object block with respect to the entire blocks, and counting the number of blocks in which the object exists; and determining a new grid start point having a minimum number of blocks in accordance with a result of the counting.

13. A grid moving method using a selective pixel searching method, comprising the steps of:

forming a grid with respect to an image of an object having a predetermined shape, defining blocks each having a predetermined size, and moving the grid;

a search and count step for selectively searching a pixel whether an object exists in the block with respect to an edge boundary portion of the block in a manner of skipping the blocks by N-blocks, terminating the search when a pixel of the object is first searched, performing a step for determining the block in which an object exists as an object block with respect to the entire blocks, and counting the number of blocks in which the object exists; and determining a new grid start point having a minimum number of blocks in accordance with a result of the counting.

14. A grid moving method using a selective pixel searching method, comprising the steps of:

forming a grid with respect to an image of an object having a predetermined shape, defining blocks each having a predetermined size, and moving the grid;

a search and count step for selectively searching a pixel whether an object exists in the block with respect to an edge boundary portion of the block in a manner of skipping the blocks by N-blocks, terminating the search when a pixel of the object if first searched, performing a step for determining the block in which an object exists as an object block with respect to the entire blocks, and counting the number of blocks in which the object exists; and determining a new grid start point having a minimum number of blocks in accordance with a result of the counting;

splitting an object image to be coded into four sub-blocks after the grid moving step in such a manner that an upper and leftward portion is defined as a first sub-block, an upper and rightward portion is defined as a second sub-block, a lower and leftward portion is defined as a third sub-block, and a lower and rightward block is defined as fourth sub-block, thus selectively searching the objects, whereby the blocks are selectively searched in accordance with a result that a predetermined block is judged to correspond to a predetermined sub-block among the first, second, third and fourth blocks.

15. The method of claim 14, wherein said searching is performed in a zig-zag manner with respect to the edge boundary portion from the rightward and lower corner pixels in the first sub-block in order to determine whether an object exists in a predetermined block.

16. The method of claim 14, wherein said searching is performed in a zig-zag manner with respect to the edge boundary portion from the leftward and lower corner pixels in the second sub-block in order to determined whether an object exists in a predetermined block.

17. The method of claim 14, wherein said searching is performed in a zig-zag manner with respect to the edge boundary portion from the rightward and upper corner pixels in the third sub-block in order to determine whether an object exists in a predetermined block.

18. The method of claim 14, wherein said searching is performed in a zig-zag manner with respect to the edge boundary portion from the leftward and upper corner pixels in the fourth sub-block in order to determine whether an object exists in a predetermined block.

* * * * *